United States Patent
Nakamura (10) Patent No.: US 9,857,668 B2
(45) Date of Patent: Jan. 2, 2018

(54) HEAD-UP DISPLAY DEVICE FOR VEHICLE DISPLAYING A VIRTUAL IMAGE AHEAD OF A VIRTUAL LINE OF AN OBSERVER

(71) Applicant: Yazaki Corporation, Tokyo (JP)

(72) Inventor: Go Nakamura, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/289,236

(22) Filed: Oct. 10, 2016

(65) Prior Publication Data

US 2017/0023789 A1 Jan. 26, 2017

Related U.S. Application Data

(63) Continuation of application No. PCT/JP2015/062350, filed on Apr. 23, 2015.

(30) Foreign Application Priority Data

May 12, 2014 (JP) ................................. 2014-098294

(51) Int. Cl.
*G03B 21/14* (2006.01)
*B60K 35/00* (2006.01)
(Continued)

(52) U.S. Cl.
CPC ............ *G03B 21/142* (2013.01); *B60K 35/00* (2013.01); *B60K 37/02* (2013.01); *G02B 27/01* (2013.01);
(Continued)

(58) Field of Classification Search
CPC B60K 35/00; B60K 37/02; B60K 2350/1072; B60K 2350/2052; B60K 2350/2056; B60K 2350/965; G02B 27/01; G02B 27/0149; G02B 2027/0159; G02B 2027/0183; G02B 2027/0185; G03B 21/142
See application file for complete search history.

(56) References Cited

U.S. PATENT DOCUMENTS 4,711,544 A * 12/1987 Iino ...................... G02B 27/01
345/7
5,646,639 A * 7/1997 Koie ..................... G02B 27/01
340/920
(Continued)

FOREIGN PATENT DOCUMENTS

JP 05-147456 A 6/1993
JP 2004-126226 A 4/2004
(Continued)

OTHER PUBLICATIONS

International Search Report mailed Jul. 7, 0215, issued for PCT/JP20151062350.

*Primary Examiner* — Sultan Chowdhury
*Assistant Examiner* — Magda Cruz
(74) *Attorney, Agent, or Firm* — Locke Lord LLP (57) ABSTRACT

Provided is a display device capable of adequately displaying in accordance with a condition. In a HUD device including a projector projecting an image that is to be a virtual image, a screen to which an image from the projector is projected, a magnifying optic magnifying the image projected on the screen, the screen is moved by an actuator in a direction parallel to an optical axis of the projector.

4 Claims, 5 Drawing Sheets

(51) Int. Cl.
*G02B 27/01* (2006.01)
*B60K 37/02* (2006.01)

(52) U.S. Cl.
CPC .. *G02B 27/0149* (2013.01); *B60K 2350/1072* (2013.01); *B60K 2350/2052* (2013.01); *B60K 2350/2056* (2013.01); *B60K 2350/965* (2013.01); *G02B 2027/0159* (2013.01); *G02B 2027/0183* (2013.01); *G02B 2027/0185* (2013.01)

(56) References Cited

U.S. PATENT DOCUMENTS

| | | | | |
|---|---|---|---|---|
| 6,580,562 | B2* | 6/2003 | Aoki | G02B 27/0101 345/7 |
| 9,348,140 | B2* | 5/2016 | Kusaka | G02B 27/01 |
| 2006/0215020 | A1* | 9/2006 | Mori | B60R 1/00 348/119 |
| 2009/0005961 | A1* | 1/2009 | Grabowski | G01C 21/365 701/532 |
| 2009/0160736 | A1* | 6/2009 | Shikita | G02B 27/0101 345/7 |

FOREIGN PATENT DOCUMENTS

| | | |
|---|---|---|
| JP | 2009-150947 A | 7/2009 |
| JP | 2015-031700 A | 2/2015 |

* cited by examiner

HEAD-UP DISPLAY DEVICE FOR VEHICLE DISPLAYING A VIRTUAL IMAGE AHEAD OF A VIRTUAL LINE OF AN OBSERVER

BACKGROUND OF THE INVENTION

Field of the Invention

The present invention is related to a display device displaying a virtual image ahead of a visual line of an observer.

Description of the Related Art

Well known is a display device that is called head-up display in which a display unit emitting a driving data such as a running speed, and an optical member such as lens forming the driving data emitted from the display unit at a desired position as a desired-sized display image is embedded in a dashboard of a vehicle, and forms the display image that is overlapped on a scene at the desired position ahead of the vehicle by irradiating the driving data emitted from the display unit to a windshield.

This type of head-up display has better readability than a conventional guidance directly reading instrument due to reduction of visual line movement of a driver.

Disadvantageously, because when running speed of the vehicle increases a focal length of the driver moves far and a visual range becomes narrow, the conventional head-up display posed the following problems upon high speed travelling.

Shortness of a distance to the displaying image requires time to move the focal length of eye from background to the displaying image. Therefore, comparing alternately the background and the displaying image makes the driver (observer) further tired from. Moreover, narrowness of the visual range of the driver increases an occupancy ratio of the displaying image, making the driver feel intrusive.

Japanese Patent Publication No. H5-147456, in order to solve these problems, discloses that the display distance is made larger upon high-speed travelling, and that the number of dots per one character decreases.

SUMMARY OF THE INVENTION

Disadvantageously, in the case of a display device recited in Japanese Patent Publication No. H5-147456, because a display unit composed of dotted liquid crystal display elements is moved in order to change a display distance, a case is made larger, possibly incurring cost increase. Moreover to decrease the number of dots per one character results in reducing the number of image elements per one character, posing problem of aggravating display quality.

Therefore, the present invention, in light of problems aforementioned, is to provide a display device capable of adequately displaying in accordance with condition.

The present invention according to a first aspect, in order to solve the above problems, is characterized in that in a display device displaying a virtual image ahead of a visual line of an observer includes a projector projecting an image to be the virtual image; a projected unit to which an image from the projector is projected; an magnifying unit extending an image projected to the projected unit; and a motion unit moving the projected unit in a direction parallel to an optical axis of the projector.

The invention according to a second aspect is characterized in that the invention of the first aspect further includes: a speed obtaining unit obtaining a running speed of the vehicle; and a first controller controlling the motion unit according to the running speed of the vehicle obtained by the speed obtaining unit, the speed obtaining unit and the first controller being mounted in the vehicle.

The display device according to a third aspect is characterized in that the invention of the first and second aspects further increases: a portion obtaining unit obtaining a running position of the vehicle; and a second controller controlling the motion unit according to the position of the vehicle obtained by the position obtaining unit, the position obtaining unit and the second controller being mounted in the vehicle.

According to the invention according to the first aspect, as mentioned above, to move the projected unit in the direction parallel to the optical axis of the projector by the motion unit makes it possible to change displaying distance and displaying size only by moving a screen or the like that is the projected unit, implementing adequate displaying in accordance with condition with low cost.

According to the invention of to the second aspect, the first controller, since controlling the motion unit in accordance with the running speed of the vehicle the speed obtaining unit obtains, can control such as to display smaller at far side upon high-speed running, and to display larger at near side upon low-speed running for example.

According to the invention of the third aspect, the second controller, since controlling the motion unit in accordance with the position of the vehicle the position obtaining unit obtains, can display larger at near side upon traveling in a town, and display a detailed data such as obstacle warning or navigation data.

DETAILED DESCRIPTION OF THE DRAWINGS

DETAILED DESCRIPTION OF THE PREFERRED EMBODIMENTS

First Embodiment

Figure 1:
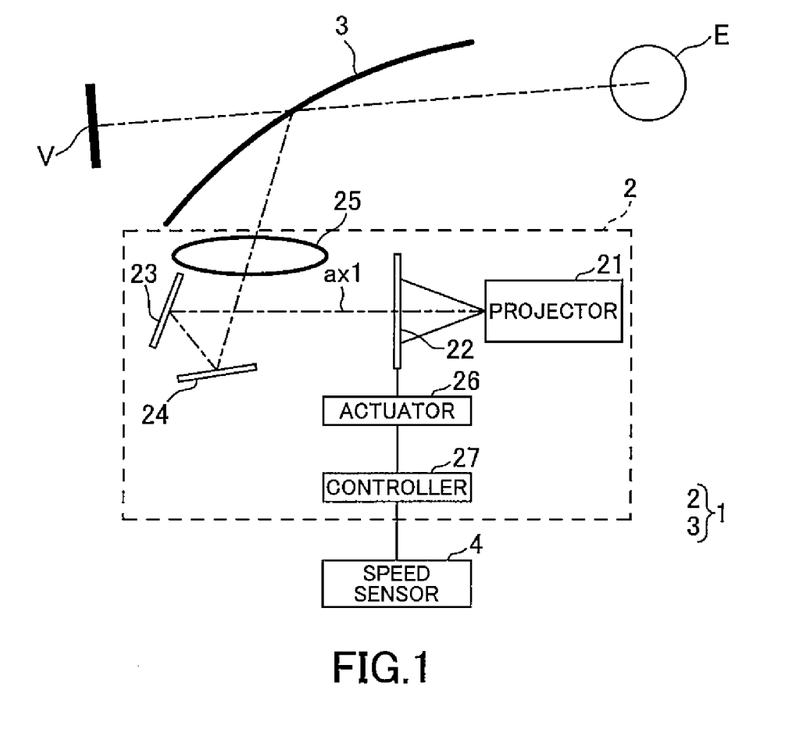
FIG. 1 is a configuration view of a head-up display device according to a first embodiment of the present invention.

Next, with reference to FIGS. 1 to 8 a first embodiment of the present invention will be explained. FIG. 1 is the configuration view of a head-up display device according to the first embodiment of the present invention.

The head-up display device 1 (HUD) according to the first embodiment of the present invention includes a HUD 2 main body shown in FIG. 1 and a windshield 3, mounted in a vehicle or the like.

The HUD main body 2 includes a projector 21 as a projector, a screen 22 as a projected unit, plate mirrors 23, 24, a magnifying optic 25 as a magnifying unit, an actuator 26 as a motion unit, a speed obtaining unit, and a controller 27 as a first controller. The HUD main body 2 is housed in an instrument panel of the vehicle in the vicinity of a lower end of a windshield 3. And an image is projected toward the wind shield 3 from the projector 21, and front view that is sighted passing through the windshield 3 and an image observed by an observer as a virtual image V reflected on the windshield 3 are superpositioned and sighted. Note that the reference numeral E in FIG. 1 denotes an eye point corresponding to a position of an eye of the driver (observer).

The projector 21 includes a given light source and a given lens or the like, and generates and projects an image light to the screen 21 in accordance with an image signal or a synchronizing signal inputted from outside. As the projector 21 for example can be used a projector provided with a digital mirror device (DMD), a light source and the like. Alternatively, it is possible to use a liquid crystal projector or the like provided with a liquid crystal panel and a light source lighting and passing therethough, or the like. Namely, the projector 21 projects an image that is to be the virtual image V.

The screen 22 is a transmission typed screen with light diffusion property diffusing the image light projected from the projector 21 toward its back side and is formed such that light diffusion material composed of micro particle is included in a light transmission resin for example so as to have light diffusion property. Moreover, the screen 22 is movable by the actuator 26 in a direction parallel to an optical axis ax1 of the image light generated from the projector 21. Moreover, the screen 22 is preferred to be arranged such that the optical axis ax1 passes through the middle thereof.

The plate mirror 23 is arranged above the optical axis ax1 of the projector 21 and outside a movable range of the screen 22, and reflects the image light the screen 22 diffused toward the plate mirror 24 toward the plate mirror 24. The plate mirror 24 reflects the image light the plate mirror reflected toward the magnifying optic 25.

The magnifying optic 25 is an optic including a lens or the like that extends, and projects on the windshield 3, the image light the plate mirror 24 reflected. Note that instead of the magnifying optic 25 or the plate mirrors 23, 24 a concave mirror may be used. Namely, it may also be configured that the concave mirror magnifies, and reflects on the windshield 3 the image light the screen 22 reflected.

The windshield 3 is formed into a curved shape curving in a vertical direction or a horizontal direction in accordance with an outer diameter of the vehicle, using a laminated glass, an IR cut glass, a UV cut glass or the like for example. Then the windshield 3 transmits the visual line of the driver in a vehicle interior, and reflects the image projected from the HUD main body 2 in the visual direction.

The actuator 26 is constituted by an actuator or the like for example, and moves the screen 22 in parallel to the optical axis ax1 by a command from the controller 27. The actuator 26 moves arbitrary section determined corresponding to a scope in which a display position or a displaying size of the virtual image V is changed between the position at which the projector 21 is arranged and a position at which the plate mirror 23 is arranged.

The controller 27 is configured of, for example, a microcomputer in which a CPU (Central Processing Unit) and a memory and the like are incorporated, an ASIC (Application Specific Circuit), or a combination of the microcomputer and the ASIC. Moreover, the controller 27 is also provided with an interface or the like into which a signal enters from a speed sensor 4 mentioned later.

The HUD is connected to the speed sensor 4. The speed sensor 4 is an element which rotates together with a car shaft, and which outputs car speed pulse signal in accordance with a rotation of a magnet, and an output of the speed sensor 4 is inputted to the controller 27. Then the controller 27 can calculate by cycle of the car speed pulse signal a speed.

The HUD device 1 configured as such has the virtual image V displayed at a position ahead of the driver's visual line and interposing the windshield 3.

Figure 2:
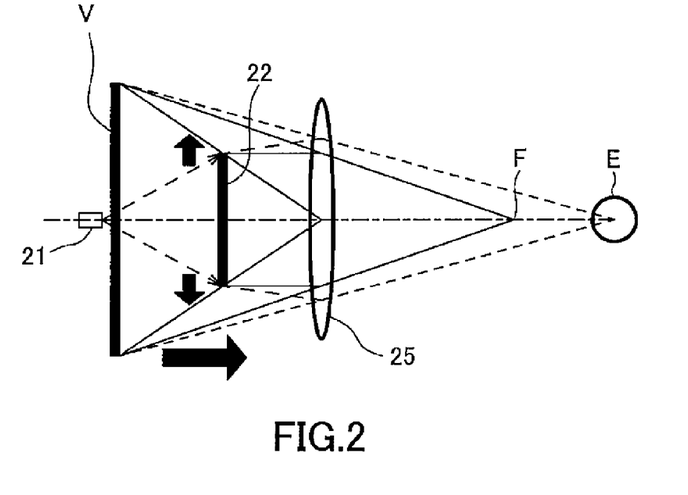
FIG. 2 is an explanatory view of relationship of screen motion and display on the head-up display device show in FIG. 1.
Figure 3:
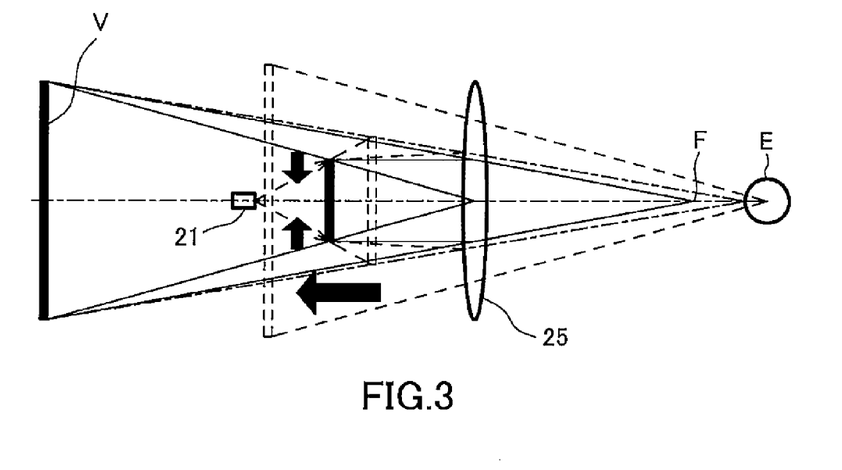
FIG. 3 is an explanatory view of relationship of screen motion and display on the head-up display device shown in FIG. 1.

Then, an image display in the HUD device 1 configured as such will be explained with reference to FIGS. 2 and 3. FIGS. 2 and 3 are views simplifying the configuration of FIG. 1 into the projector 21, the screen 22, and the magnifying optic 25. Note that an eye point E is assumed to be located farther than a focal position F of the magnifying optic 25.

As shown in FIG. 2, moving the screen 22 far from the projector 21 enlarges the image to be projected on the screen 22. Therefore shortening of a distance from the magnifying optic 25 to the virtual image even enlarges a display size of the image.

On the other hand, as shown in FIG. 3, moving the screen 22 to the projector 21 reduces the image to be projected on the screen 22. Therefore, lengthening the distance from the magnifying optic 25 to the virtual image even reduces the display size of the image.

Here, it will be explained with reference to FIGS. 4 to 8 how the virtual image acts upon variation of the position of the screen projecting image and the display size.

Figure 4:
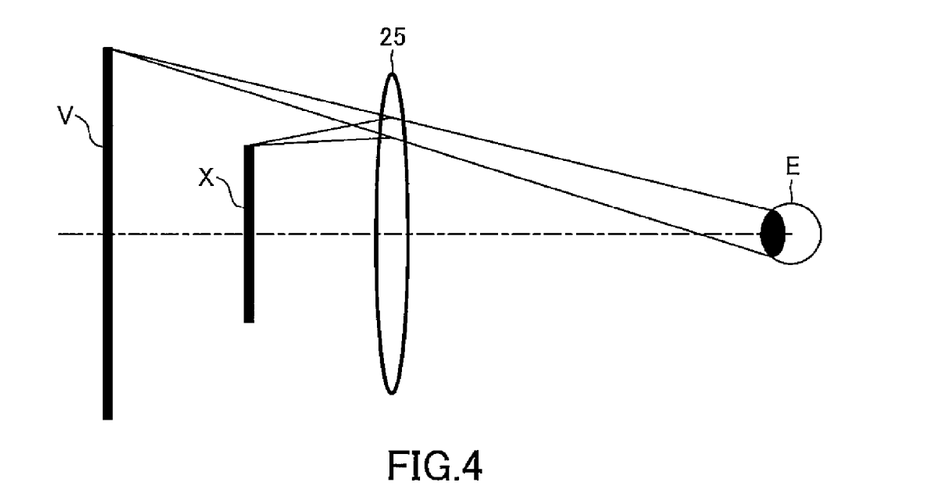
FIG. 4 is an explanatory view of a visual image upon observing the visual image through an magnifying optic.

FIG. 4 is an explanatory view of the virtual image V when observing the object X through the magnifying optic 25. As shown in FIG. 4, when the object X is located nearer than the focal length of the magnifying optic 25, a beam of light becomes slightly extending that is emitted through the magnifying optic 25 from the object X. The virtual image V appears where this extending light is extended reversely from the magnifying optic 25 and intersects (converges).

Figure 5:
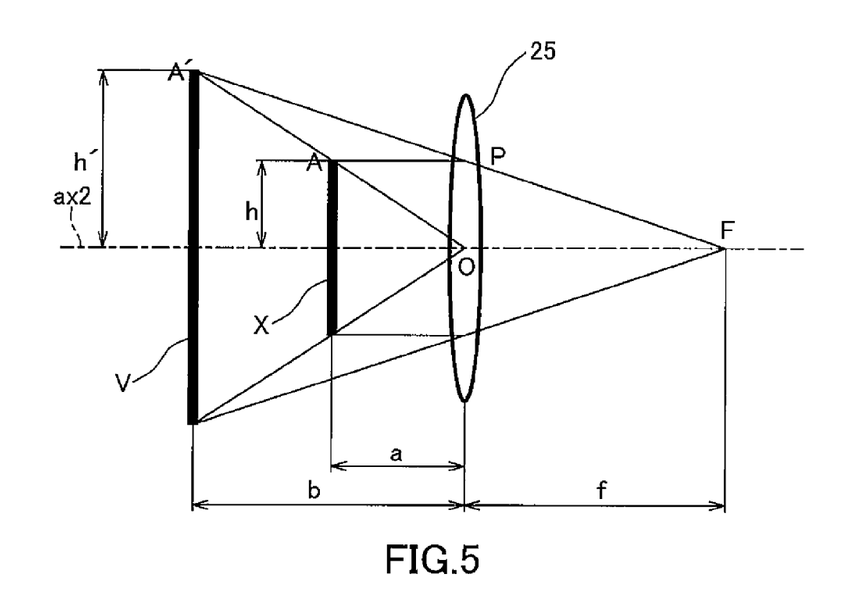
FIG. 5 is an explanatory view of a method of calculating a position and a size when a position of the virtual image.

Then any point A on the object X shown in FIG. 4 is, as shown in FIG. 5, when passing through the magnifying optic 25, observed at the point A' as the virtual image. Note that the reference numeral P in FIG. 5 denotes a height of a point A on the magnifying optic 25, the reference numeral O a principal point of the magnifying optic 25, the reference numeral F a focal position of the magnifying optic 25, the reference numeral a a distance from the magnifying optic 25 to the object X, the reference numeral b a distance from the magnifying optic 25 to the virtual image V, the reference numeral f a focal distance of the magnifying optic 25, the reference numeral h a height of the object X, and the reference numeral h' a height of the virtual image V, respectively.

Where the distance b from the magnifying optic 25 to the visual image V is expressed by a formula (1) below.

$$1/a - 1/b = 1/f \qquad (1)$$

where the term "/" denotes division.

Moreover, the height h' of the virtual image V can be calculated by multiplying the height h of the object X by magnification m.

$$h' = mh \qquad (2)$$

$$m = b/a \qquad (3)$$

Figure 6:
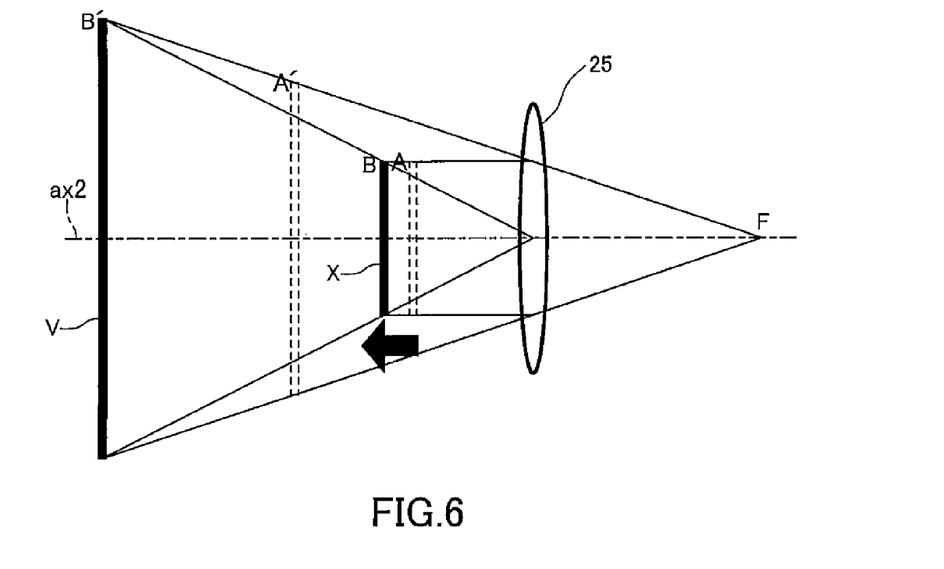
FIG. 6 is an explanatory view of change of the virtual image when a position of the object changes.

Then, variation of the virtual image V when the position and the height of the object X are varied will be explained with reference to FIGS. 6 to 8. FIG. 6 is the view when the position of the object X is changed to keep away from the state in FIG. 4. As shown in FIG. 6, when the object is made away from the magnifying optic 25 in a direction parallel to an axis ax2 passing the principal point O and the focal point F of the magnifying optic 25, any point A on the object X in parallel moves to the point B. Then because the magnifying magnification by the magnifying optic 25 increases, the distance of the virtual image X also becomes farther. Namely, the point A' moves to the point B' farther than the point A' from the magnifying optic 25.

Figure 7:
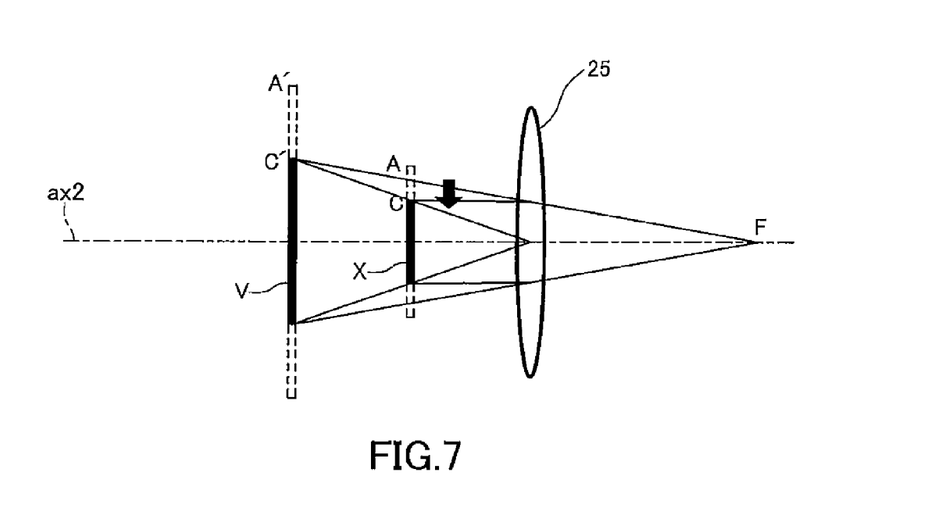
FIG. 7 is an explanatory view of change of the virtual image when a height of the object changes.

FIG. 7 is the explanatory view of changing such that the height of the object X in a state of FIG. 4 is reduced. As shown in FIG. 7, when the height of the objection X is reduced any point A on the object X moves to the point C. Then, the height of the virtual image V becomes reduced. Because the magnifying magnification by the magnifying optic 25 remained unchanged, the point A' moves to the point C' nearer the axis ax2 than the point A'.

Figure 8:
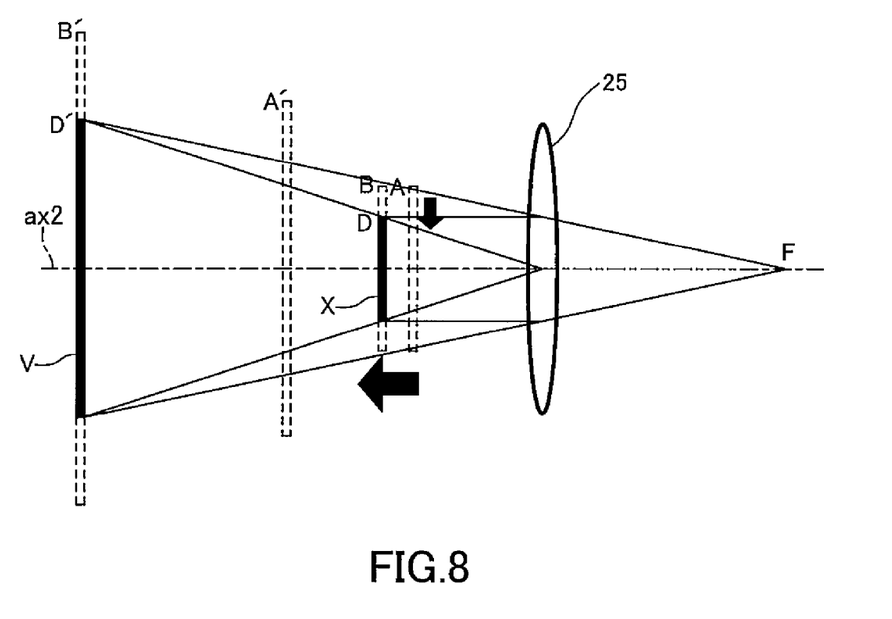
FIG. 8 is an explanatory view of change of the virtual image when the position and the height of the object change.

Therefore, in order to make the position farther away and to reduce the height of the virtual image V the position of the object X may, as shown in FIG. 8, be kept away from the magnifying optic 25, and the height of the object X may be reduced. Namely, applying this to the HUD device 1 shown in FIG. 1, assuming that the axis ax2=optical axis ax1, closing the screen 22 to the projector 21 reduces the image to be projected on the screen 22 as shown in FIG. 3. This corresponds to reducing the height of the object X. Moreover, closing the screen 22 to the projector 21 makes the screen 22 farther away from the magnifying optic 25, making the position of the virtual image V far away from the eye point. This corresponds to making the object X far away from the magnifying optic 25.

On the other hand, as shown in FIG. 2, making the screen 22 far away from the projecting 21 enlarges the image to be projected on the screen 22. This corresponds to increasing the height of the object X. Moreover, making the screen 22 far away from the projector 21 makes the screen 22 close to the magnifying optic 25, making the position of the virtual image V close to the eye point E. This corresponds to closing the object X to the magnifying optic 25.

Therefore, by configuring as shown in FIG. 1, making the screen 22 far away from the projector 21 closes the virtual image V to the eye point E, and displays the image larger. Closing the screen 22 to the projector 21 makes the virtual image V far away from the eye point E, and displays the image smaller.

Motion of the screen 22, that is, control of the actuator 26 is made in accordance with a running speed of the vehicle (vehicle speed pulse signal) the controller 27 obtains from the speed sensor 4. For example, controlling the screen 22 to depart from the projector 21 as the running speed of the vehicle becomes higher can display the virtual image V farther and smaller. Namely, the controller 27 controls such as to obtain the running speed of the vehicle and control the actuator 26 (motion unit) in accordance with the obtained running speed of the vehicle.

Note that the screen 22 may successively move in conformity with the change of the running speed of the vehicle. Alternatively, three positions of $\alpha$, $\beta$, and $\gamma$ are set from positions of optical axis as1 nearer the projector 21, respectively, and the screen 22 may move to the predetermined position in accordance with a plurality of speed thresholds, such that the screen 22 is positioned at $\gamma$ when the running speed is 0 km/h or more and less than 30 km/h, the screen 22 at $\beta$ when the running speed is 30 km/h or more and less than 60 km/h, the screen 22 at $\alpha$ when the running speed is 80 km/h or more.

A preferred position or size of the virtual image V upon each controlling can be set to a preferred position or size in accordance with each running speed by obtaining on the basis of formulas (1) to (3) abovementioned.

Note that because variation of the display size of the screen 22 changes display brightness, it is preferable to control luminous flux quantity of the projector 21 via the controller 27 in accordance with the position of the screen 22 such as to make the display brightness constant.

According to the present embodiments, in the HUD device 1 including the projector 21 projecting the image to become the virtual image, the screen 22 on which the image from the projector 21 is projected, and the magnifying optic 25 magnifying the image projected on the screen 22, the screen 22 is moved via the controller 26 in the direction parallel to the optical axis ax1 of the projector 21. It follows from this configuration that since only motion of the screen 22 can change the display distance to the virtual image V, that is, the display position of the virtual image V or the display size of the virtual image V, it is possible to cost-favorably achieve adequate display in accordance with conditions.

Furthermore, since the number of image elements (the number of dots) remains unchanged even though the display size changes, the display quality is not deteriorated Furthermore, since the controller 27 controls the actuator 26 in accordance with the running speed of the vehicle obtained from the speed sensor 4, it is possible to control such as to display father and smaller upon high speed running, or nearer and larger upon low speed running.

Second Embodiment

Figure 9:
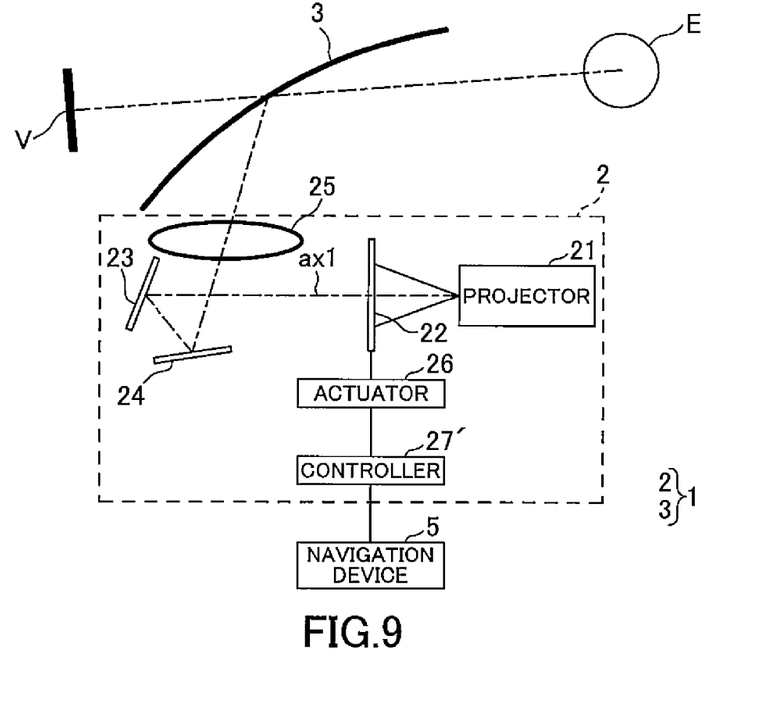
FIG. 9 is a configuration view of the head-up display device according to the second aspect of the invention.

Next, the second embodiment will be explained with reference to FIG. 9. Note that the same parts as the aforementioned first embodiment is denoted as the same reference numerals, and explanation thereof will be omitted. FIG. 9 is the configuration of the head-up display according to the second aspect of the invention.

The head up display (HUD) device 1 according to the second embodiment of the present invention, as shown in FIG. 2, includes a HUD main body 2 and a windshield 3.

The HUD main body 2 is generally similar to the first embodiment, but the controller 27 is replaced by a controller 27'. The controller 27' as the position obtaining unit and the second controller is connected to the navigation device 5.

The navigation device 5, as known, includes a unit to obtain a current position such as GPS (Global Positioning System), a storing unit such as hard disc into which map data is stored, a display unit such as liquid crystal display displaying map or guidance information, and a controller such as CPU executing search of path from the current position to a set destination.

The present embodiment is to obtain the current position and map data from the navigation device 5, and if the current position lies in town, the visual image V approaches to the eye point E and the image is displayed larger. Then guidance information of the navigation device 5 is also displayed. Alternatively, each warning information may also be displayed such as obstacle warning information a not-shown obstacle detector (infrared radiation, radar or the like) detected. Namely, the controller 27' obtains the running position of the vehicle, and controls the actuator 26 (motion unit) on the basis of the obtained position of the vehicle.

Note that in FIG. 9 the current position and the map data are obtained from the navigation device 5, but data of GPS receiver or data to determine the town such as map data may be obtained to determine.

According to the present embodiment, since the controller 27' controls the actuator 26 in accordance with the position of the vehicle obtained from the navigation device 5, it is possible to display nearer and larger upon travelling in the town, and to display detailed data such as obstacle warning information or navigation data.

Note that aforementioned two embodiments may be combined. Namely, the position of the screen 22 may be moved in accordance with the running speed and the position.

Furthermore, the present invention is not limited to the aforementioned embodiments. Namely, those skilled in the art can perform various variations following conventional known knowledge without departing from gist of the present invention. The concerned variations, as far as including the configuration of the display device of the present invention, should of course be included in the scope of the present invention.

DESCRIPTION OF SYMBOLS

1 HUD device (display device)
21 projector (projecting means)
22 screen (projected unit)
25 magnifying optic (magnifying unit)
26 actuator (motion unit)
27 controller (speed obtaining unit, first controller)
27' controller (position obtaining unit, second controller)
3 windshield
4 speed sensor
5 navigation device

What is claimed is:

1. A display device displaying a virtual image ahead of a virtual line of an observer, comprising:
  a projector projecting an image becoming the virtual image;
  a projected unit to which an image from the projector is projected;
  an magnifying unit magnifying the image projected to the projected unit;
  a motion unit moving the projected unit in a direction parallel to an optical axis of the projector;
  a speed obtaining unit which rotates together with a vehicle shaft and obtains a running speed of the vehicle; and
  a first controller controlling the motion unit according to the running speed of the vehicle obtained by the speed obtaining unit, whereby controlling the projected unit to depart from the projector and display the virtual image farther and smaller as the running speed of the vehicle becomes higher.

2. The display device according to claim 1, wherein the speed obtaining unit and the first controller are mounted in the vehicle.

3. The display device according to claim 1, further comprising:
  a position obtaining unit obtaining a running position of a vehicle; and
  a second controller controlling the motion unit according to the running position of the vehicle obtained by the position obtaining unit, the position obtaining unit and the second controller being mounted in the vehicle.

4. The display device according to claim 2, further comprising:
  a position obtaining unit obtaining a running position of a vehicle; and
  a second controller controlling the motion unit according to the running position of the vehicle obtained by the position obtaining unit, the position obtaining unit and the second controller being mounted in the vehicle.

* * * * *